April 13, 1926.
G. M. PETERSON
WORK SUPPORTING STAND
Filed Dec. 4, 1924
1,580,627
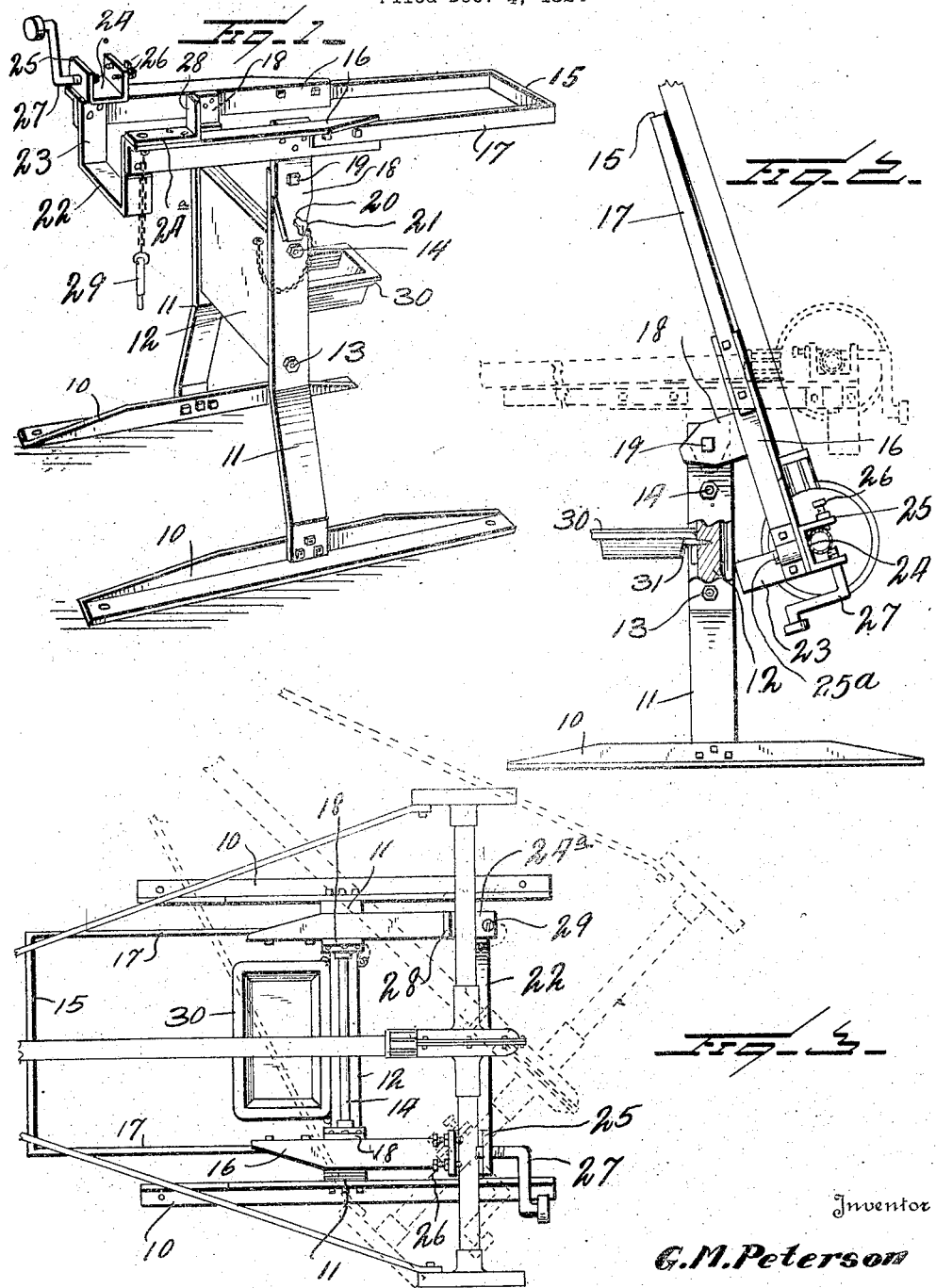
Inventor
G. M. Peterson
By Watson E. Coleman
Attorney Patented Apr. 13, 1926.

1,580,627

UNITED STATES PATENT OFFICE.

GEORGE M. PETERSON, OF STURGEON BAY, WISCONSIN.

WORK-SUPPORTING STAND.

Application filed December 4, 1924. Serial No. 753,946.

*To all whom it may concern:*

Be it known that I, GEORGE M. PETERSON, a citizen of the United States, residing at Sturgeon Bay, in the county of Door and State of Wisconsin, have invented certain new and useful Improvements in Work-Supporting Stands, of which the following is a specification, reference being had to the accompanying drawings.

This invention relates to work supporting stands, and particularly to the work supporting stand illustrated in my application for Patent Serial #635,920, filed May 1, 1923, of which application the present application is a continuation in part.

The general object of this invention is to provide a work supporting stand for use in garages and machine shops for the purpose, as illustrated in my prior application, of supporting the motor block, transmission case and other parts of a motor car when being overhauled, and particularly to a motor stand having means whereby a rear axle housing, the transmission shaft and allied parts may be supported for overhauling.

A further and more specific object of the invention is to provide a supporting structure of this character which is particularly designed for supporting the rear end housing and the transmission shaft of an automobile in a horizontal position with the transmission shaft lying upon the upper surface of the supporting frame, and further to pivot one of the clamps engaging the housing so that the housing and shaft may be swung laterally without throwing either of them out of parallel with the upper face of the frame.

A further object is to provide a device of this character which is very simple, which is relatively light and, therefore, may be shifted to any desired point in the machine shop, which is firm, and which may be disassembled for packing and shipment or readily assembled whenever desired.

Other objects have to do with the details of construction and arrangement of parts as will appear more fully hereinafter.

My invention is illustrated in the accompanying drawing, wherein:—

Figure 1 is a perspective view of a work supporting stand constructed in accordance with my invention;

Figure 2 is a side elevation of the work supporting stand showing the supporting frame turned to an upwardly inclined position and supporting a rear axle housing and transmission gear, the figure showing in dotted lines the work supporting frame and the supported parts in a horizontal plane;

Figure 3 is a top plan view of the construction shown in Figures 1 and 2 and showing a rear axle and allied parts supported thereon and showing in dotted lines the manner in which this rear axle may be shifted with relation to the frame.

Referring to this drawing, it will be seen that my stand comprises the two horizontally extending, parallel angle irons 10 which form the base of the device and to which are attached by bolts, rivets or other suitable means the upwardly extending standards 11. These standards extend inward and upward and then straight upward. Disposed between the parallel portions of the standards is a block 12 of wood or other suitable material spacing the standards apart, and passing through the standards and through grooves in the upper and lower faces of this block are bolts 13 and 14 holding the block firmly in place, the block preventing any collapse of the standards.

Mounted upon the upper ends of the standards for oscillation thereon is a U-shaped supporting frame, designated generally 15, which consists of the angle iron members 16 forming the ends of the U-shaped frame and the strap iron member 17 which forms the bight portion of this frame. The members 16 have relatively wide, horizontally disposed flanges and the depending flanges of the members 16 are provided with ears 18 which extend downward against the outer faces of the standards 11 and are pivotally secured thereto by means of bolts 19 or in any other suitable manner. One or both of these ears is formed with an aperture 20 and a pin 21 which, as illustrated, is connected to the standard by a chain which may be disposed through this aperture when this aperture is in alignment with the corresponding aperture in the corresponding upright so as to hold the frame in a horizontal position. If this pin is removed, however, the frame may be shifted into angular relation to a horizontal plane and held in this position by tightening up upon the bolts 19. The upper portion of the U-shaped frame 15 is connected by a transverse bar 22. The ends of this cross bar are turned upwardly, as at 23, and riveted, bolted or otherwise attached to the vertical flanges of the angle irons 16. Thus this U-shaped frame is thoroughly braced and yet is made of relatively light material.

Mounted upon the ends of the angle irons 16 remote from the strap iron 17 are the work clamps 24 and 24ª. The clamp 24 is formed of a piece of flat iron having upwardly extending ends forming clamping jaws. One of these jaws 25 so formed is provided with a pair of inwardly extending screws 26, while the opposite jaw 25 has a screw 27 having a crank on its end. Thus it will be seen that anything placed within this clamp is held by a three-point bearing. The clamp 24 is pivotally mounted by a pivot 25ª upon the horizontal flange of the angle iron 16 so that it may be rotated to any desired angular position. The opposite clamp is simply formed with an upwardly extending lug 28 at one end and at its opposite end with an aperture into which may be disposed the pin 29 which is chained to the angle iron 19.

Attached to the block 12 on one side thereof is a pan 30 in which bolts and nuts may be dropped, this pan being preferably detachably held upon the block 12 by means of pins on the pan engaging with eyes 31, the pins hooking into these eyes so that the pan is detachable.

In the use of this device, the rear axle, the rear axle housing, the transmission shaft, the radius rods and other allied parts may be taken as a whole and disposed within the clamps. The clamp screws 26 and 27 are turned up so as to engage one side of the rear axle housing firmly and the pin 29 will hold the other side of the rear axle housing in place, but if it be desired, for instance, to disassemble one end of the rear axle housing or for any reason rotate the rear axle and its allowed parts the pin may be removed and then the clamp 24 will rotate upon its pivot pin so that these parts may be turned around to any desired position. Normally the work stand will be disposed with the U-shaped supporting frame in a horizontal position but it may be also turned into nearly a vertical position or into an intermediate position and the parts shifted by reason of the rotatably mounted clamp into almost any position to present the work properly to the workman.

While I have particularly designed this work supporting stand for use in connection with the rear axle, rear axle housing, radius rods and transmission shaft of an automobile, it will be obvious that it may be used for a variety of work which is likely to be done around an automobile shop.

While I have illustrated certain details of construction and arrangement of parts, I do not wish to be limited thereto as it is obvious that many changes might be made in these details without departing from the spirit of the invention.

I claim:

1. A work supporting stand of the character described comprising standards, a substantially U-shaped frame having its upper face disposed substantially in a uniform plane, said frame being pivoted to said standards for movement into or out of a horizontal plane, the open end of the U-shaped frame being connected by a transversely extending cross bar, the cross bar being depressed below the level of the frame, a clamp mounted upon the extremity of one arm of the frame, and a clamp mounted upon the extremity of the other arm of the frame, the last named clamp being pivotally mounted for rotation in the plane of the frame said clamp embodying opposed jaws.

2. A work supporting stand of the character described comprising a pair of upright standards, an approximately U-shaped frame pivotally connected to said standards for movement into or out of a horizontal plane, the frame having its upper face disposed substantially in a uniform plane, the open end of the frame being formed of two approximately parallel angle irons, a connecting cross bar connected to said angle irons, the cross bar having upwardly extending extremities whereby the cross bar is depressed below the level of the frame, a clamp mounted upon one arm of said U-shaped frame and including a removable pin, a clamp mounted upon the other arm of the supporting frame for rotation in the plane of said frame, said clamp comprising opposed lugs, and clamp screws passing through said lugs.

3. A work support of the character described comprising uprights, feet supporting the uprights, means bracing the uprights from each other, a U-shaped frame mounted upon the uprights and comprising opposed, parallel angle irons and a connecting U-shaped strip, said frame having its upper face disposed substantially in a uniform plane, ears attached to the depending flanges of the angle irons and pivotally connected to the uprights of the supporting frame, a transverse connecting bar having upturned ends riveted to the depending flanges of the angle irons, said bar being disposed at the open end of the U-shaped frame, a work clamp mounted upon the upper flange of one of said angle irons at the extremity thereof and comprising an upwardly extending lug and a detachable opposed pin, a clamp mounted upon the extremity of the other angle iron comprising a strip of iron formed with upwardly extending, opposed, parallel lugs, and clamp screws passing through said lugs, the clamp being pivotally mounted upon the upper flange of the corresponding angle iron for rotation in the plane of said iron.

4. A work supporting stand of the character described comprising angle iron feet, legs extending upward from the feet and having parallel portions at their upper ends, a work supporting frame pivotally mounted upon the upper ends of the legs, means for holding the work supporting frame in a horizontal position, said means being detachable to permit the frame to be oscillated into angular relation to the horizontal, work supporting clamps mounted upon one extremity of the frame, one of said clamps being pivoted to the frame for rotation in the plane of the frame and having clamp screws, a brace between the parallel portions of the legs comprising a block disposed between said parallel portions, and bolts passing through the legs and through grooves in the upper and lower edges of said block.

5. A work stand for rear axle housings and transmission shafts embodying a substantially U-shaped frame having its upper face disposed substantially in a uniform plane, the ends of the U-shaped frame being provided with oppositely disposed clamps adapted to hold the axle housing horizontal and with the shaft resting upon the upper face of the frame, one of the clamps comprising opposed jaws and being swiveled to permit the housing and shaft to be swung laterally in a plane parallel to the plane of the frame.

6. A work stand for rear axle housings and transmission shafts embodying a frame having housing supporting clamps on its opposite sides and having feet, and having a substantially flat supporting face disposed entirely in one plane, one of said clamps comprising opposed jaws and being swiveled to permit lateral swinging of the housing and shaft in their plane of assembly in the frame, and a supporting base to which said frame is pivoted to permit adjustable movement of the housing shaft and frame away from or into a horizontal plane.

In testimony whereof I hereunto affix my signature.

GEORGE M. PETERSON.